United States Patent
Dolgov et al.

(10) Patent No.: US 8,060,271 B2
(45) Date of Patent: Nov. 15, 2011

(54) DETECTING PRINCIPAL DIRECTIONS OF UNKNOWN ENVIRONMENTS

(75) Inventors: Dmitri A. Dolgov, Ann Arbor, MI (US); Sebastian Thrun, Stanford, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 685 days.

(21) Appl. No.: 12/134,763

(22) Filed: Jun. 6, 2008

(65) Prior Publication Data

US 2009/0306881 A1    Dec. 10, 2009

(51) Int. Cl.
*G05D 1/00* (2006.01)

(52) U.S. Cl. ........... 701/28; 701/206; 701/211; 701/300

(58) Field of Classification Search .................... 701/28, 701/33, 36, 200, 207, 211; 382/103, 204, 382/276; 348/169, 208.14
See application file for complete search history.

(56) References Cited

U.S. PATENT DOCUMENTS

| | | |
|---|---|---|
| 6,507,661 B1 | 1/2003 | Roy |
| 6,766,037 B1 | 7/2004 | Le et al. |
| 7,359,555 B2 | 4/2008 | Porikli et al. |
| 2007/0156286 A1 | 7/2007 | Yamauchi |
| 2007/0280528 A1 | 12/2007 | Wellington et al. |
| 2008/0033645 A1 | 2/2008 | Levinson et al. |

*Primary Examiner* — Gertrude Arthur Jeanglaude
(74) *Attorney, Agent, or Firm* — Gifford, Krass, Sprinkle, Anderson & Citkowski, P.C.

(57) ABSTRACT

Apparatus and methods according to some embodiments of the present invention use a graphical model, such as a Markov random field model, to represent principal driving directions within an environment. The model has a plurality of nodes representing spatial locations within the environment, and the principal direction for each node is determined probabilistically using linear features detected within an image of the environment. Apparatus and methods according to embodiments of the present invention can be used in improved autonomous navigation systems, such as robotic vehicles.

17 Claims, 11 Drawing Sheets

DETECTING PRINCIPAL DIRECTIONS OF UNKNOWN ENVIRONMENTS

FIELD OF THE INVENTION

The present invention relates to apparatus and methods for detecting principal driving directions within an environment.

BACKGROUND OF THE INVENTION

Operation of autonomously navigating vehicles, such as robotic vehicles, preferably includes determination of safe and predictable routes through an environment. A human driver is generally capable of detecting principal directions within an environment, such as drivable passageways through a parking lot. However, this is a challenge for autonomous navigation systems capable of operating with human input.

SUMMARY OF THE INVENTION

The present invention relates to apparatus and methods for detecting principal directions within an environment, such as detecting principal driving directions within unmapped environments to facilitate the autonomous navigation of robotic vehicles.

Examples of the present invention include apparatus and methods that determine features of an environment, such as principal driving directions for driving through the environment. In this context, a principal driving direction (sometimes referred to more briefly as a "principal direction" in examples below) represents a vehicle direction within the environment that a human-operated vehicle would conventionally use, corresponding to directions that a vehicle would be expected to take through the environment. For example, when driving along a road, the principal direction is parallel to the road. In some examples, the principal direction at a point may be multi-valued, for example orthogonal directions where each direction is parallel to a side of a generally rectangular area. In some examples, the sense of direction may be significant (for example, in order to remain on the correct side of a road), in other examples forwards and backwards along the same line may be equivalent.

Examples of the present invention allow improved autonomous navigation by vehicles, such as robotic vehicles, particularly in highly structured environments for which an accurate map may not be available. Highly-structured environments may include as parking lots, shopping malls, construction zones, and the like. Examples of the present invention allow an autonomous navigation system to detect drivable lanes and principal directions in such environments, allowing the vehicle to navigate the environment in a safer and more predictable manner.

The determination of principal directions helps a robotic vehicle to comply with driving rules and conventions, allowing predictable operation and allowing the robotic vehicle to safely share the environment with human drivers.

Data relating to the environment may be provided from on-board sensors, and/or be obtained from other sources. In one approach, sensor data is collected from a sensor associated with a vehicle, or is otherwise obtained. The sensor data is used to generate a representation of the environment, which may be transformed into a two-dimensional representation of the environment. Linear features are detected within the environment, for example using an edge detection algorithm.

A probabilistic graphical model is then used to obtain the distribution of principal directions within the environment. The graphical model, such as a Markov random field model, is set up having a plurality of nodes representing spatial locations within the environment. The principal direction for each node is determined probabilistically. For example, the graphical model may be used to find the distribution of principal directions over the environment. The nodes may correspond to spatial locations distributed over a two-dimensional grid laid over the environment. The nodes may have an associated cell, representing an area of the environment local to the node.

Detected linear features within each cell of the graphical model are used to find the local principal direction. If there are a plurality of linear features proximate the spatial location corresponding to a node, for example a plurality of linear features passing through the associated cell, the node may have associated with it a plurality of local principal directions. These local principal directions associated with one node may have different weights associated with then, and weighting factors may include the length of linear features, temporal persistence, contrast between regions separated by linear features, image recognition of road markings or other features, and the like. Linear features provide local evidence of the principal direction for a given node of the graphical model, for example if a linear feature runs through a cell associated with a node, or is otherwise proximate to the spatial location corresponding to the node.

For many nodes, there may be no useful local evidence of principal direction obtained from the image of the environment. There may be many nodes for which there are no linear features proximate to the spatial location represented by the node. In such cases, the local principal direction for each node can be determined using a potential function for principal direction changes between nodes. The potential function may be chosen to prevent discontinuous or rapid changes in the principal direction, and/or to allow for smooth transitions in principal direction as a function of spatial position between nodes for which the principal direction can be determined from local evidence. The potential function is used to propagate principal direction determinations from nodes proximate a detected feature to the remaining nodes. Hence, even if linear features are sparse, a principal direction can be assigned to all nodes in a probabilistically most likely fashion. Adjacent nodes may represent closely spaced positions within the environment (for example, points separated by 0.1-10 m), so that the principal direction may not be expected to change greatly from one node to the neighboring node, for example possibly in the range 0-20 degrees).

For example, suppose a first linear feature is proximate a spatial location corresponding to a first node, and a second linear feature is proximate a spatial location represented by a second node. The principal direction for the first node can be determined from the first linear feature, for example being substantially parallel to the first linear feature. Similarly, the principal direction for the second node can be determined. In this example, the first and second nodes are separated by a plurality of nodes for which there is no local evidence of principal direction. A potential function is selected for changes in principal direction going from one node to a neighboring node, such that the principal direction varies continuously from the first node to the second node. Using this or a similar approach, principal directions can be obtained for all relevant nodes even if the local evidence is sparsely distributed over the environment.

In some examples, a plurality of linear features are proximate a spatial location corresponding to a first node. The principal direction for the first node can be determined using a combination, such as a weighted average, of angular orientations of the proximate linear features and/or other local evidence for the principal direction. Similarly, a weighted average can be used to determine the principal direction for a second node, and the principal directions for nodes between the first and second nodes, absent other local evidence, can be estimated using the potential function.

Some areas of the environment may be inaccessible to the vehicle, for example due to obstacles. Obstacles may be physical barriers, changes in surface composition (e.g. water, grass, and the like may be detected as obstacles), and the like. No principal direction need be assigned to nodes corresponding to inaccessible areas of the environment. Obstacle detection may use the same environmental sensor, but image resolution may be greater if desired.

An example method of determining principal directions for an environment comprises forming a graphical model of the environment (such as a Markov random field model), the graphical model having nodes corresponding to spatial locations within the environment. Principal directions are determined for the nodes using linear features detected within the environment. For nodes proximate one or more detected linear features, principal directions are determined from the angular orientation of the linear features. In some examples, for the node to be considered proximate to the linear feature, the linear features runs through a cell associated with a node. In other examples, different proximity measures may be used, such as distance thresholds between the linear feature and the spatial coordinate represented by the node. For nodes not proximate the linear features, principal directions are determined using a potential function for change in principal direction between neighboring nodes, the potential function being selected to obtain a smooth variation in principal directions between neighboring nodes.

Nodes may represent an array of spatial coordinates within a two-dimensional image representing the environment, for example a square or rectangular grid. The array may also be triangular or other geometric arrangement of node points used. A sensor system can be located on a vehicle to provide image data. For computational simplicity, the image data may be projected onto a two-dimensional representation, so that the nodes may be a planar grid even in the presence of slight altitude changes.

The principal directions may then be used to steer the vehicle through the environment. For example, a computer on the vehicle may determine the principal directions using a Markov random field model, and be further operable to select a path from a current location to a target location consistent with the detected principal directions. Preferably, the path is generally parallel to the local principal direction along its length.

The potential function for change in principal direction between neighboring nodes can be chosen to give a smooth variation in principal direction from a first node proximate a linear feature, over intervening nodes not proximate to a linear feature, so a second node proximate another linear feature.

In some examples of the present invention, a method of determining principal driving directions within an environment comprises obtaining image data representing the environment, detecting linear features within the image data, forming a graphical model of the environment, the graphical model having a plurality of nodes corresponding to spatial locations within the environment, determining principal directions for nodes proximate the linear features using angular orientations the linear features, and assigning principal directions for other nodes so as to obtain a smooth variation of principal direction between adjacent nodes, the smooth variation being obtained using a potential function for angular changes in principal direction between nodes.

An example apparatus to assist autonomous navigation of a vehicle through an environment comprises an environment sensor supported by the vehicle, and an electronic circuit such as a computer, receiving sensor data from the environment sensor, the electronic circuit being operable to detect linear features within the environment, and determine principal directions within the environment using a Markov random field model. The electronic circuit may comprise a processor operable to execute algorithms implementing methods such as those described herein, memory, data input configured to receive image data, and a data output. The data output may be used as a control signal for a robotic vehicle, for example a steering and/or acceleration signal. A vehicle may accelerate after successful determination of a path to a target location that is consistent with principal direction data.

A vehicle may support a sensor system including a lidar sensor, a radar sensor, an optical sensor, an IR sensor, an ultrasound sensor, or other sensor, or a combination of one or more such sensors.

BRIEF DESCRIPTION OF THE DRAWINGS

FIG. 1A shows aerial imagery of a parking lot, and FIG. 1B illustrates a typical structure imposed on the environment by human drivers.

FIG. 2A shows 3D lidar data; FIG. 2B shows an obstacle map; FIG. 2C shows smoothing with a Gaussian kernel; FIG. 2D shows binary thresholding; FIG. 2E shows Canny edge detection; FIG. 2F shows a Hough transform;

DETAILED DESCRIPTION OF THE INVENTION

Figure 1A:
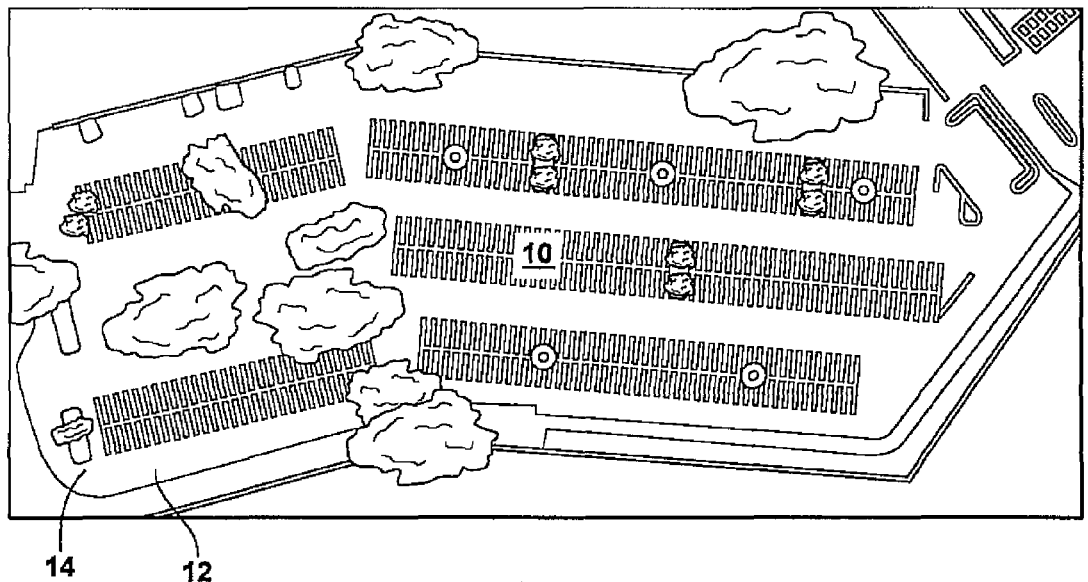
FIGS. 1A-1B illustrate detecting structure of the driving environment, where

Examples of the present invention include apparatus and methods for determining principal directions within environments, such as principal driving directions for a vehicle in a vehicle environment. Determination of principal directions allows improved autonomous navigation by a vehicle, such as a robotic vehicle.

In some environments, such as highway driving, a map can be used to determine principal driving directions, and an automated vehicle may travel along the principal driving directions.

Example environments include complex environments for which a detailed map may not be available, but in which a vehicle preferably obeys the rules of driving. Such environments may include, for example, parking lots, shopping malls, and construction zones. In such environments, human drivers are usually able to partition the space into drivable lanes and drive appropriately, even in the absence of typical road markings and signs. Examples of the present invention allow a robotic vehicle to determine such partitions and principal directions in such environments, allowing the vehicle to navigate the environment in a safer and more predictable manner.

A robot operating in such an environment can recognize features of the environment that allow it to drive in accordance with driving rules, for example using data from on-board sensors. The determination of principal directions allows a robotic vehicle to comply with driving rules and driving conventions, allowing predictable operation and allowing the robotic vehicle to safely share the environment with human drivers.

Examples of the present invention include apparatus and methods that determine features of an environment, such as principal directions for driving through the environment. Determination of the principal directions of the environment allows automatic implementation many high-level driving behaviors, such as driving on the correct side of the road (which is helpful for collision avoidance), and avoiding diagonal paths across parking lots (which is often considered rude and unsafe).

The maximum likelihood field of principal directions $\theta(x, y)$ specifies the orientation of the principal direction at every point x, y in a region of interest. Complex driving environments, such as parking lots, have several principal directions. In examples of the present invention, a statistical approach is used to determine a maximum likelihood field of principal directions using the linear features detected within an image of the environment. The linear features are detected in sensor data representative of the local environment, and are used as local evidence regarding the principal directions of the environment. A graphical model, such as a Markov random field model or Bayesian model may be used. Preferably, the graphical model is a non-directional graphical model, such as a Markov random field model.

Examples of the present invention allow determination of principal directions using sensor data, for example using data from sensors on-board a robotic vehicle. Using conventional approaches, this is a difficult task, as many environments have several principal directions that vary from point to point. Further, sensor data may be noisy and may give rise to conflicting local hypotheses regarding the global principal directions. Examples of the present invention include improved statistical approaches that allow variations of principal directions to be more reliably determined, and conflicting local evidence to be resolved. Some examples of the present invention allow computation of principal directions in real-time, useful for autonomous vehicle navigation, such as robotic vehicle applications.

Figure 1B:
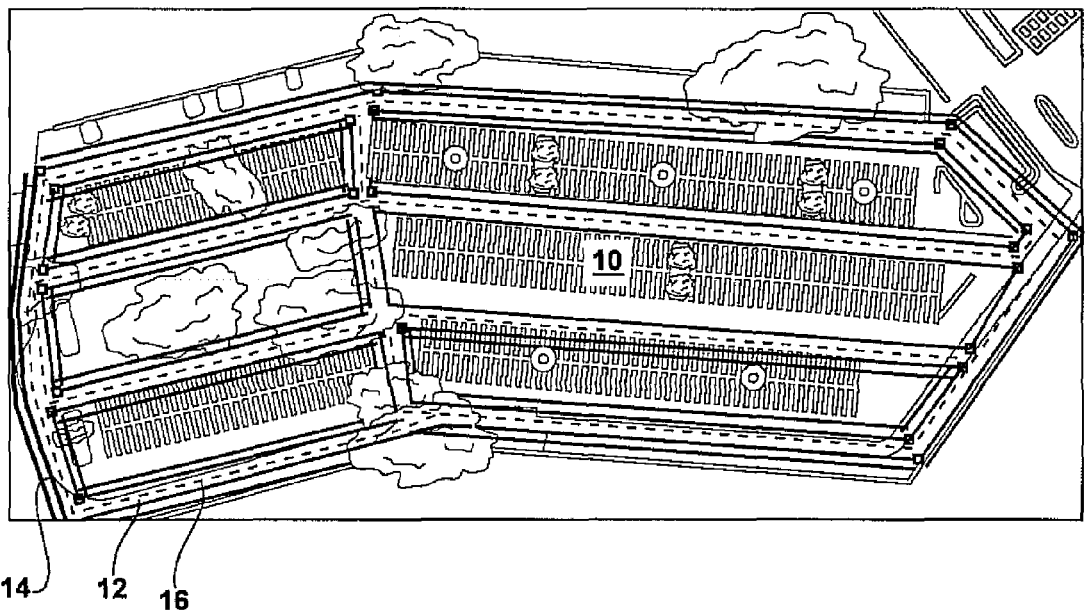

FIG. 1A shows an image of an environment, in this case parking lot 10, having drivable lanes such as 12 and 14, and FIG. 1B shows the drivable lanes such as 12 and 14 indicated using linear demarcations superimposed on the parking lot image. FIG. 1B shows a typical structure imposed on the environment by human drivers. Most people will not have any difficulty detecting main drivable lanes in a parking lot when driving in a parking lot such as shown in FIG. 1A. Principal directions are correlated with expected driving directions, for example as indicated by dashed lines such as 16.

In examples of the present invention, a field of principal directions is calculated within a probabilistic framework. A Markov random field (MRF) model was formulated that allows inference of a high-likelihood field of principal directions, assuming that at every point in the two-dimensional space of the driving environment there is a main preferred direction of motion. The input to the model may comprise observed evidence provided by the vehicle's on-board sensors.

Figure 1C:
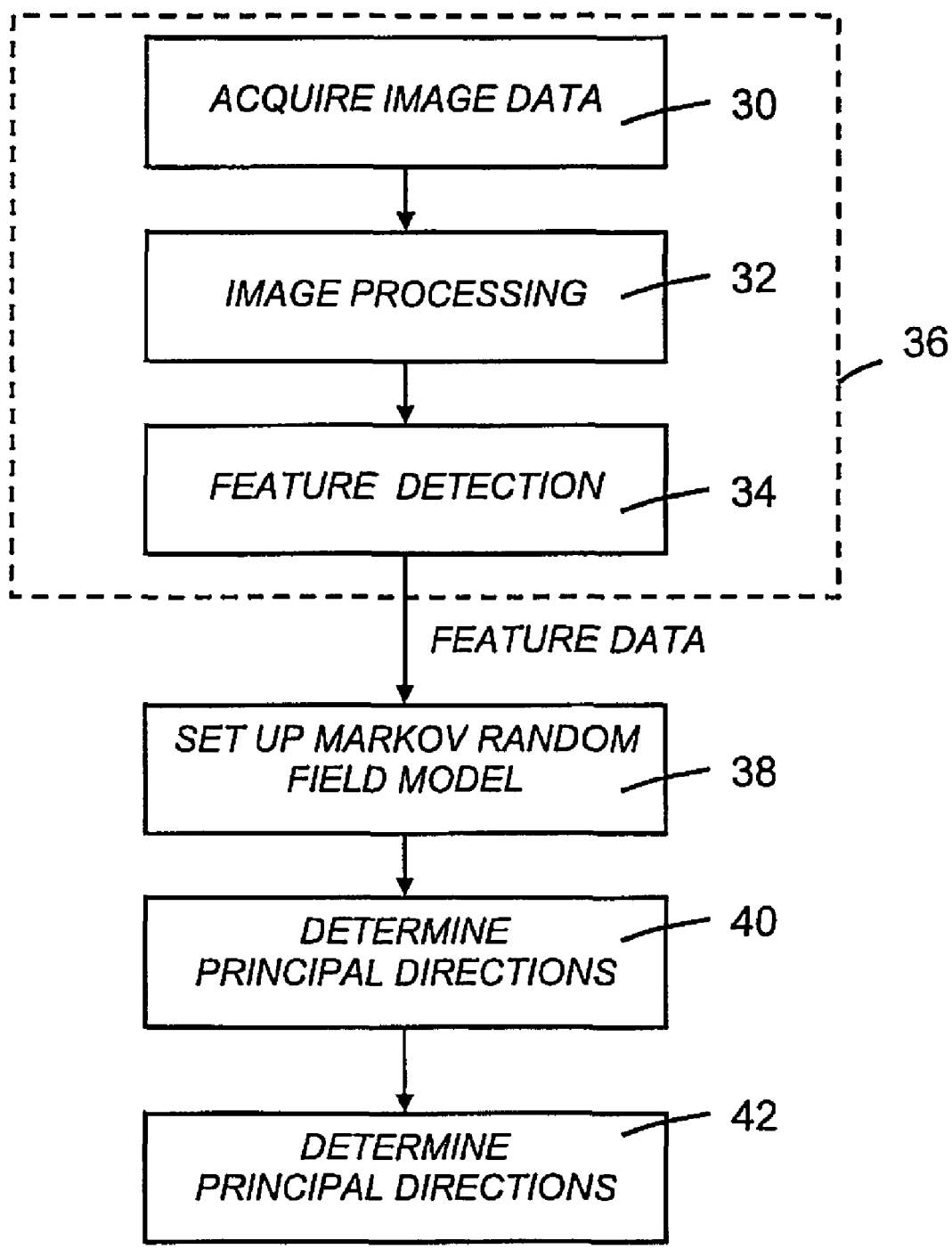
FIG. 1C illustrates a method according to an example of the present invention.

FIG. 1C illustrates an example approach, comprising acquiring image data 30, image processing 32 (which may include spatial and/or threshold filtering and edge detection), and linear feature detection 34. The output of the approach within dashed box 36 comprises linear feature data, for example length, position, and angular orientation of linear features within the image. Any appropriate process can be used to provide the linear feature data. The example approach further includes setting up a Markov Random Field (MRF) model 38, determining principal directions by using the linear feature data as local evidence of principal directions within the MRF model (40), and may further include improved path planning for an autonomous vehicle using the principal direction data (42).

Figure 1D:
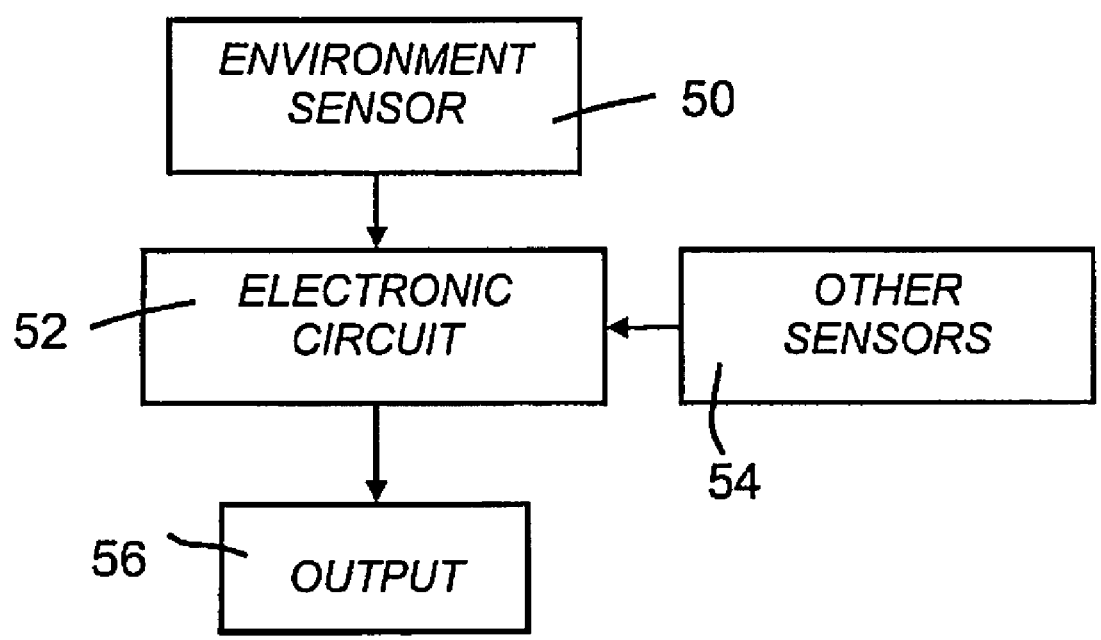
FIG. 1D illustrates an apparatus according to an example of the present invention.

FIG. 1D is a simplified schematic of an apparatus comprising environment sensor 50 (one or more sensors may be used), electronic circuit 52, other sensors 54 (for example, collision warning sensors, and output 56. The electronic circuit may be a computer including a processor operable to execute an algorithm that carries out a method such as shown in FIG. 1C.

In an example approach, a map of the environment is computed from sensor data, such as data from one or more sensors on the vehicle. Sensor data may comprise radar data, lidar data, visual data, or any type of sensor data that allows characterization of the environment. Local linear features are detected within the map, the linear features providing evidence regarding the principal directions of the environment. An MRF is formulated having nodes forming a 2D grid and representing the global principal direction of the environment at the corresponding locations. A solution to the MRF is obtained using fast numeric-optimization techniques (if an exact solution is impractical), allowing principal directions are determined for the environment.

Local evidence for an MRF-based approach can be obtained using any type of sensor system. Sensor systems are discussed further elsewhere in this specification. After obtaining image data relating to the environment, linear features can be detected within the environment using any available approach.

Linear Feature Detection

In an example approach, an environment sensor such as a lidar sensor outputs a 3D point cloud. The ground plane is filtered out and data is integrated over time. Data points are projected onto a plane, leading to a 2D obstacle map. Any line segments in the 2D map (e.g., curbs, other cars) provide local evidence of the principal driving directions ("principal directions"), and conventional computer-vision techniques can be used for finding lines in the 2D data. There are several approaches that can be used for detecting linear features in image data.

Figure 2A:
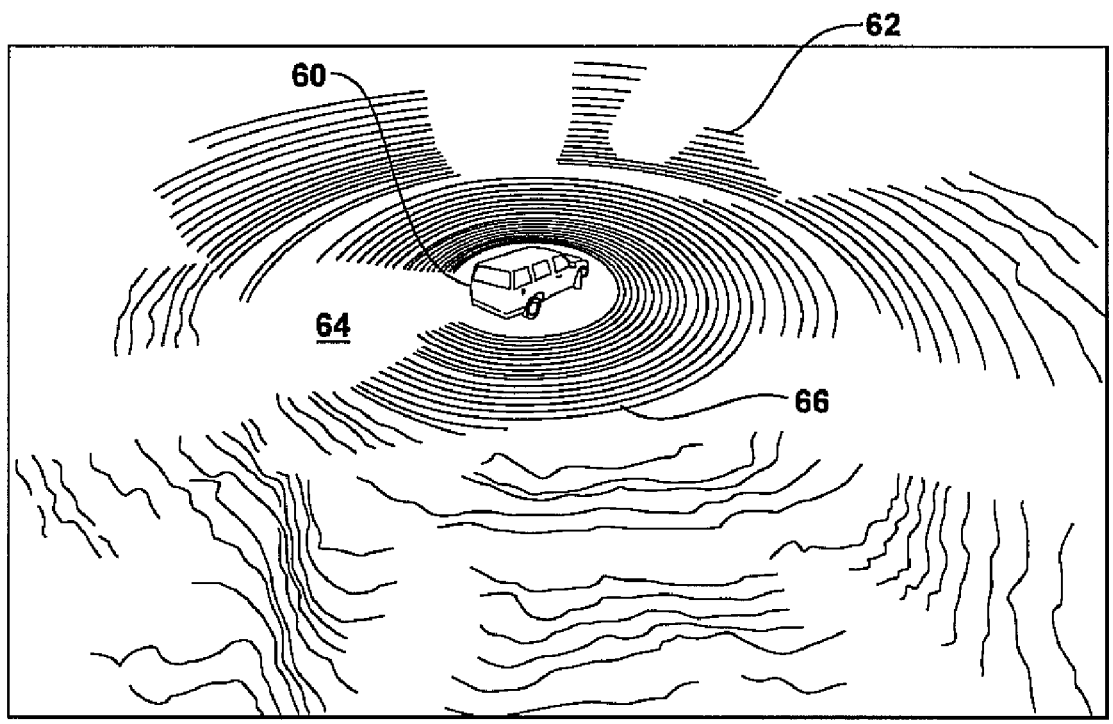
FIGS. 2A-2F illustrate line detection in an image, in this case a parking lot, where
Figure 2B:
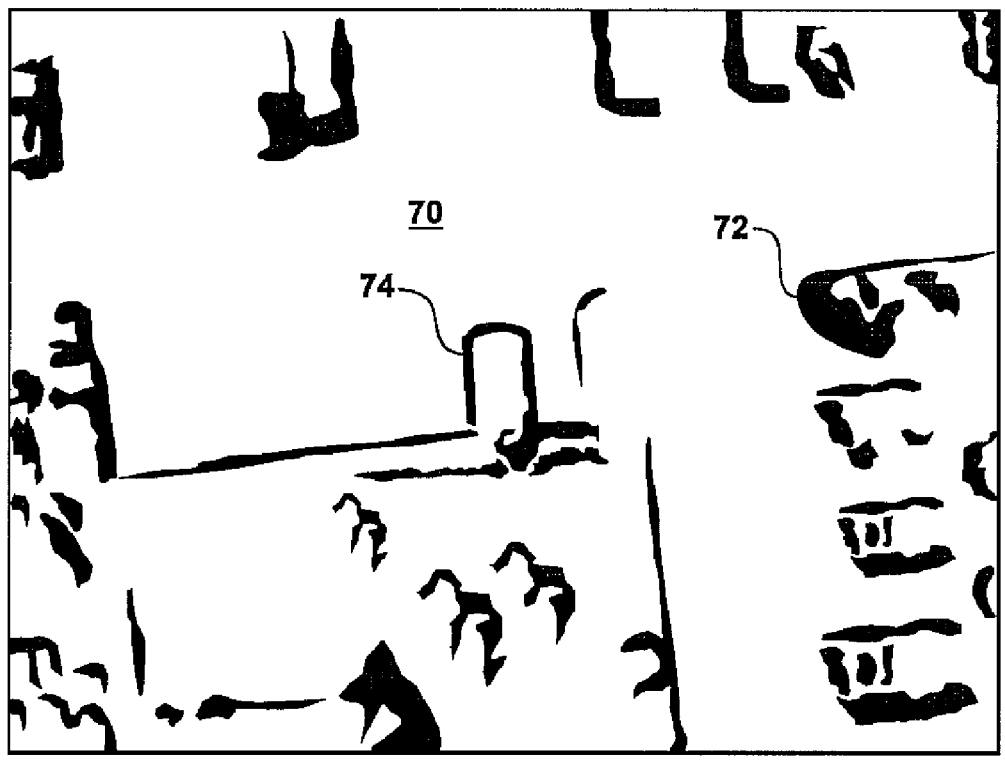

FIGS. 2A-2F show a sequence of transforms that led to satisfactory results in example experiments. FIG. 2A shows lidar image data obtained by a lidar sensor on vehicle 60, including trees 62 and paved regions 64 having boundary 66. FIG. 2B shows an obstacle map obtained from this data, including drivable regions 70, and obstacle edges 72 and 74. An MRF model need not have nodes for non-drivable regions.

Figure 2C:
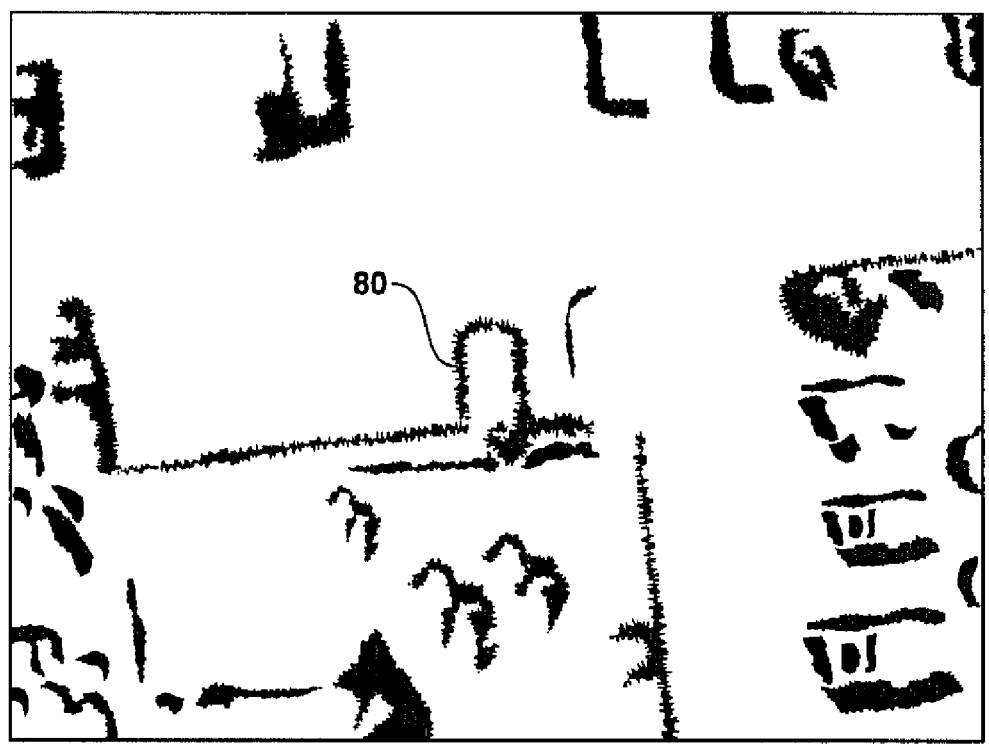
Figure 2D:
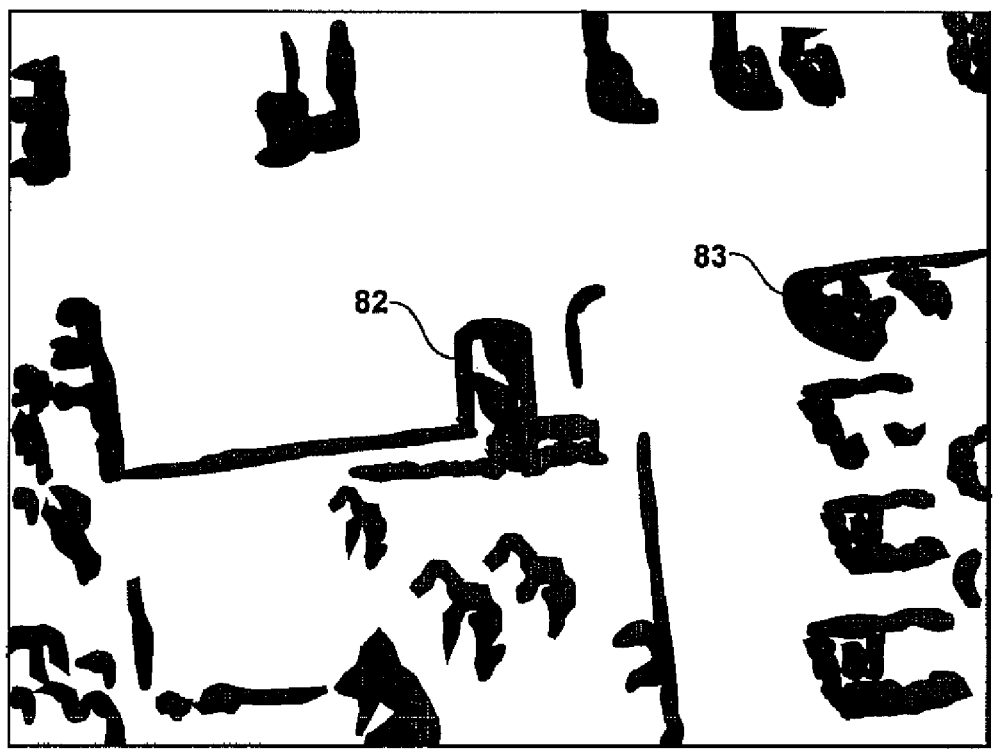
Figure 2E:
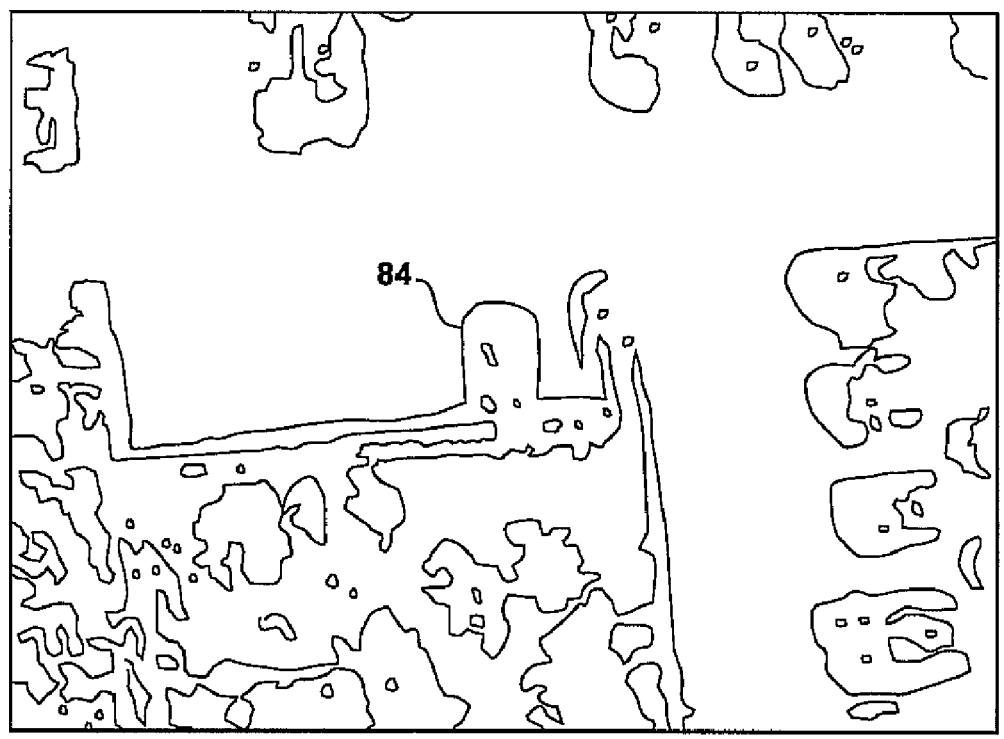
Figure 2F:
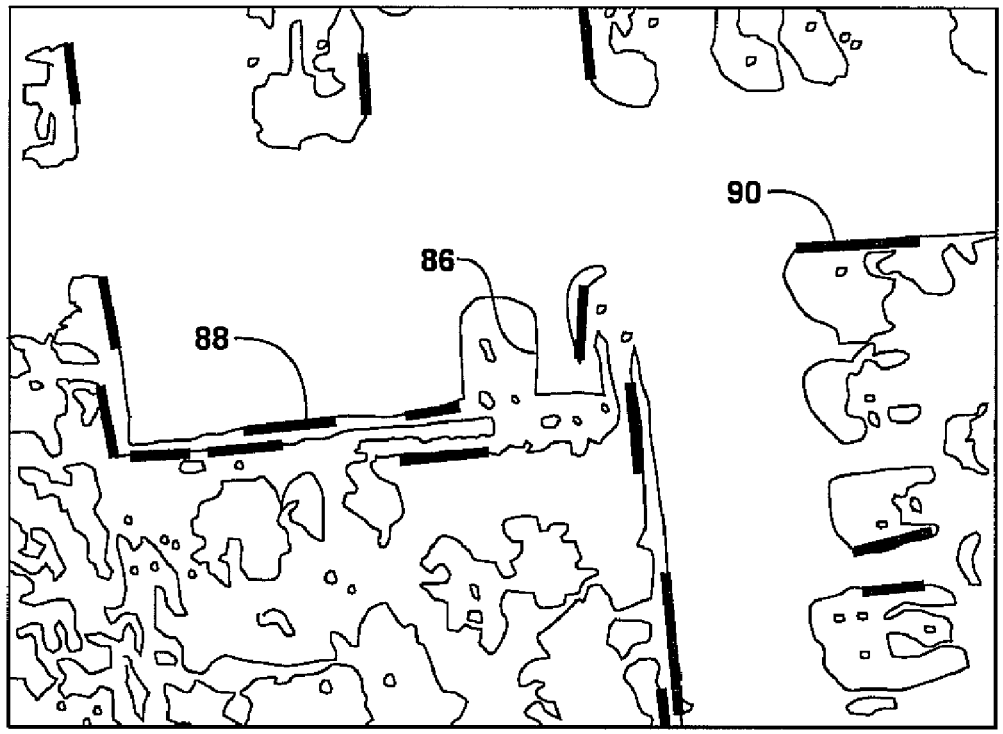

FIG. 2C shows the image data 80 after smoothing using a symmetric 2D Gaussian kernel. FIG. 2D shows the effects of a binary threshold filter (25%) applied to the data of FIG. 2C. The threshold filter removed small amplitude noise from the data, smoothed out jagged lines, and "filled in" small gaps within objects such as 82 and 83 (for example, cars or trees), thereby eliminating extra edges. FIG. 2E shows the application of a Canny algorithm used for edge detection, giving edge data 84. Finally, a randomized Hough transform (RHT) was used to find line segments in the data, shown in FIG. 2F as bold solid lines such as lines 86, 88, and 90.

Markov Random Field for Estimating Global Principal Directions

The maximum likelihood field of principal directions θ(x, y) specifies the principal orientation at every point x, y in the region of interest. Complex driving environments, such as the parking lot shown in FIG. 1A, do not have a single global orientation, but have several principal directions that differ from point to point. The lines obtained from linear feature detection represent local evidence regarding the principal directions of the environment. In examples of the present invention, a statistical approach is used to determine a maximum likelihood field of principal directions using linear features detected within an image of the environment.

In a representative example, we formulate a discrete version of the inference problem on a regular 2D grid, associating with each point $(x_i, y_i)$ an MRF node with a scalar continuous value $\theta_i$.

Figure 3A:
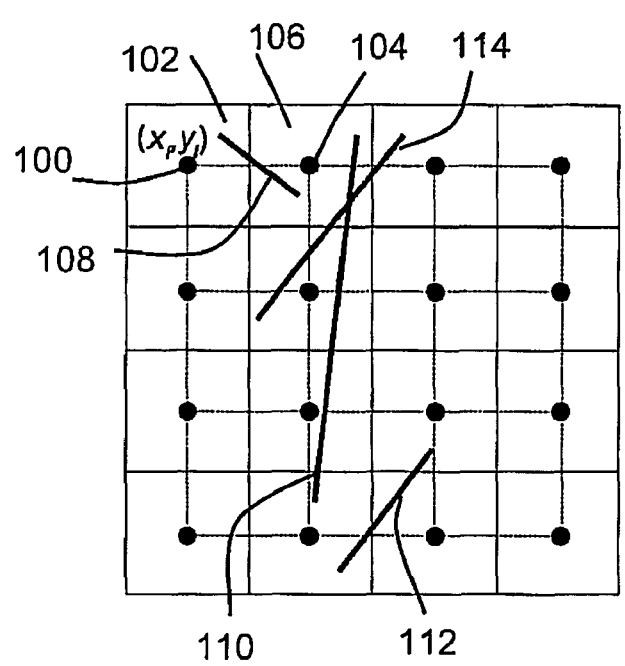
FIGS. 3A-3B illustrate a Markov Random Field (MRF) that can be used for inferring the field of principal directions of an environment.

FIG. 3A illustrates an MRF construction for inferring the field of principal directions of the environment. The nodes $\theta_i$ (such as node 100) are the MRF variables, $\alpha_{ik}$ are the input nodes, corresponding to the angles of the observed linear features (also referred to as lines). In this example, all angles are normalized to [0,π/2), because orthogonal lines (e.g., sides of a car) support the same hypothesis for the principal direction at a point. Each MRF node $\theta_i \in [0,\pi/2)$ has associated with it a set of evidence nodes $\alpha_{ik} \in [0,\pi/2)$, one for the angle of each line segment $k \in [1, K_i]$ that crosses the grid cell i.

FIG. 3A shows linear features are shown at 108, 110, 112, and 114. Each node has an associated grid square. Node 100 has associated grid square 102 and node 104 has associated grid square 106.

Figure 3B:
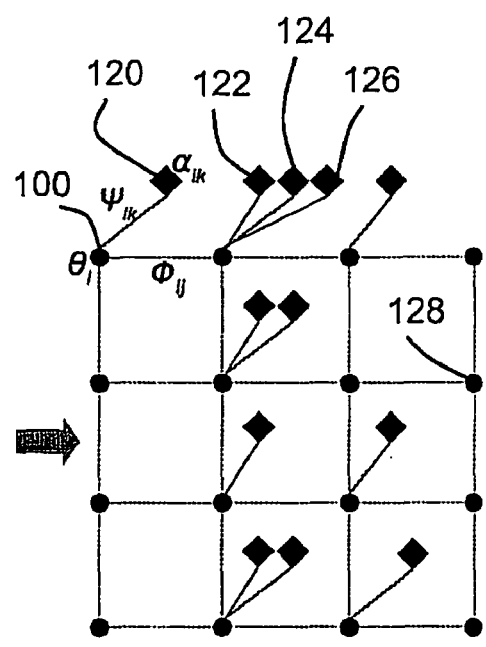

FIG. 3B represents local evidence (angular data related to the linear segments) that is used to find the local principal direction for each node proximate a linear feature. In this example, the principal direction for node 100 is determined using evidence node 120. The principal direction for node 104 is determined from combining three evidence nodes 122, 124, and 126, in this example as a weighted average. There are three evidence nodes (related to linear feature orientation angle) for node 104 as three linear features cross grid box 104. There is no local evidence for the principal direction of node 128, as there are no proximate linear features. However, the principal direction for node 128 can inferred probabilistically using a potential function for principal direction changes between neighboring nodes.

This example MRF uses two sets of potentials associated with the nodes and edges of the graph in FIG. 3. The first potential function (Ψ) is defined on the nodes of the MRF and ties each $\theta_i$ to its local evidence $\alpha_{ik}$. It is defined as follows:

$$\Psi(\theta) = \sum_i \sum_{k=1}^{K_i} \lambda_{ik} \psi(\theta_i, \alpha_{ik}), \tag{1}$$

where $\lambda_{ik}$ is the weight associated with line k, and ψ is a distance measure between two angles; both are defined below.

The second potential function (Φ) is defined on the edges of the MRF and enforces a smoothness relationship between the principal directions at neighboring nodes:

$$\Phi(\theta) = \frac{1}{2} \sum_i \sum_{j \in N(i)} \varphi(\theta_i, \theta_j), \tag{2}$$

where N(i) is the set of neighbors of node i, and φ is a distance measure between two angles (defined below). There are many reasonable choices for the distance measures ψ and φ, as well as the weights $\lambda_{ik}$. Several options were evaluated for each. The length of the corresponding line segment was used for the weights $\lambda_{ik}$, with longer segments representing stronger evidence.

The distance measures ψ and φ can be selected to obtain desired results for a particular environment. Some distances favor smoother fields (e.g., $L_2$ norm), whereas others (e.g., $L_1$ norm) have better discontinuity-preserving properties. We empirically investigated several functions, and found the following to be a good choice of a norm for both evidence and smoothness potentials:

$$\psi(\beta,\gamma) = \phi(\beta,\gamma) = \sin^2(2(\beta-\gamma)). \tag{3}$$

This measure behaves quadratically for small β−γ, and has natural wrap-around properties for our angles in the interval [0,π/2).

Finally, the distribution of the MRF variables θ for a specific set of observed α is given by a Gibbs distribution:

$$P(\theta \mid \alpha) = \frac{1}{Z} \exp(-(w_\psi \Psi + w_\varphi \Phi)), \tag{4}$$

where $w_\psi$ and $w_\phi$ are weights, and Z is a normalizer or the partition function. Our goal is to find the maximum-likelihood field of principal directions θ, given the observed evidence α:

$$\theta^*_\alpha = \arg\max_\theta P(\theta \mid \alpha), \tag{5}$$

or, in other words, find θ that minimizes the Gibbs energy $U = w_\psi \Psi + w_\phi \Phi$.

An exact maximum-likelihood solution to the MRF may be computationally impossible for anything but the simplest problems. A typical MRF for a realistic environment will have between several thousand and tens of thousands of nodes. A high-probability mode of the posterior can be computed using conjugate-gradient (CG) optimization. See for example: J. Diebel and S. Thrun, "An application of Markov random fields to range sensing", In Y. Weiss, B. Scholkopf, and J. Platt, editors, Advances in Neural Information Processing Systems 18, pages 291-298. MIT Press, Cambridge, Mass., 2006; J. R. Diebel, S. Thrun, and M. Bruenig, A bayesian method for probable surface reconstruction and decimation", ACM Trans. Graph., 25(1):39-59, 2006, which also includes a discussion of discussion of different norms in optimization; and M. R. Hestenes and E. Stiefel, "Methods of conjugate gradients for solving linear systems", Journal of Research of the National Bureau of Standards, 49:409436, 1952.

A CG approach works best when an analytical gradient of the energy is specified, which is easily computed for our MRF potentials:

$$\frac{\partial \Psi}{\partial \theta_i} = 4 \sum_k^{K_i} \lambda_{ik} \sin(2(\theta_i - \alpha_{ik})) \cos(2(\theta_i - \alpha_{ik})), \quad (6)$$

$$\frac{\partial \Phi}{\partial \theta_i} = -\frac{\partial \Phi}{\partial \theta_j} = 2\sin(2(\theta_i - \theta_j))\cos(2(\theta_i - \theta_j)). \quad (7)$$

Given the above potentials and the gradient, the implementation of conjugate gradient is standard. The output of the optimization is a high-likelihood field $\theta(x_l, y_l)$ that corresponds to the observed lines $\alpha$.

EXAMPLES

An algorithm was tested using a vehicle equipped with an Applanix pose estimation GPS-IMU system and a Velodyne 3D lidar. Representative examples of executing our method are shown in FIGS. 4A-4L. These fields of principal directions were determined during real driving experiments, the fields of principal direction being generated from lidar sensor data using a method such as described herein. Environment image data was collected using the 3D lidar.

In FIG. 4A-4L, generally the left column of images shows the 2D obstacle map obtained from the vehicle sensors. The center column shows the linear features detected in the obstacles map using a method such as described above, these linear features serve as the input to the MRF. The right column of shows the resulting field of principal directions computed by conjugate-gradient optimization.

Figure 4A:
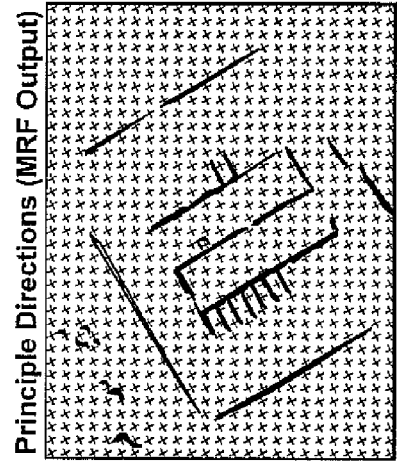
FIGS. 4A-4L show example determinations of principal directions.
Figure 4B:
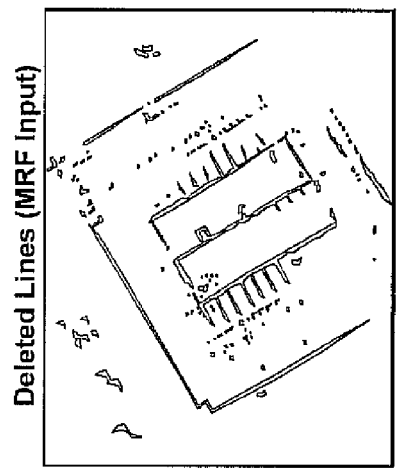
Figure 4C:
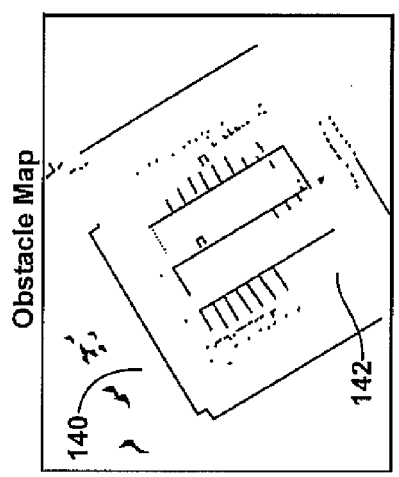

FIGS. 4A-4C show a nearly ideal scenario: a parking lot 140 with two main orthogonal principal directions, e.g. linear boundary 142, which was easily computed by the algorithm.

Figure 4D:
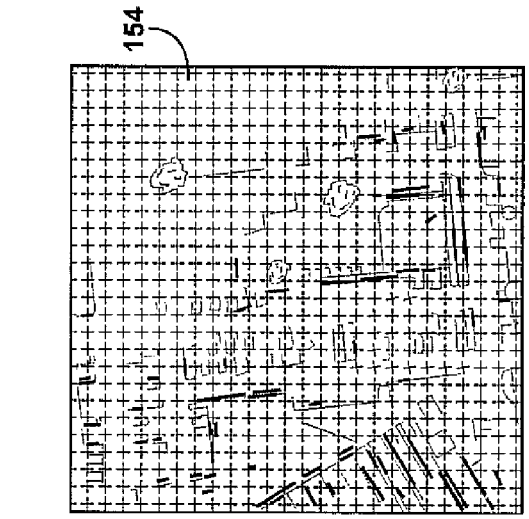
Figure 4E:
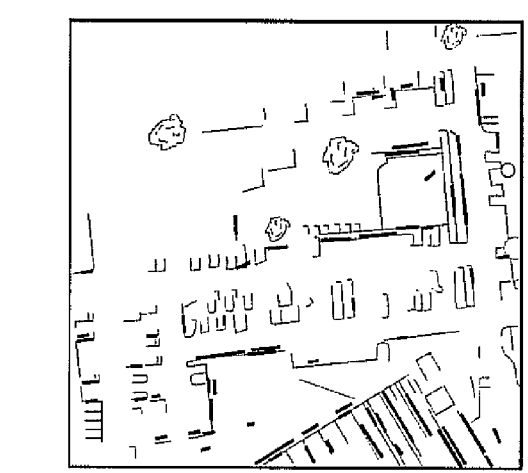
Figure 4F:
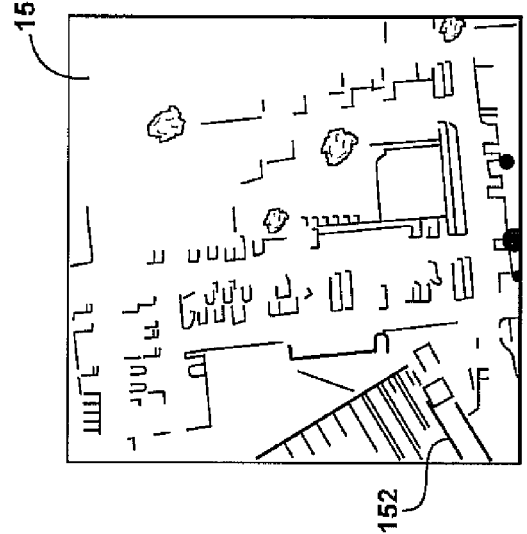

FIGS. 4D-4F show data for another, more complex, parking lot 150. This image included trees and a second, differently oriented, parking lot 152 in the bottom-left part of the map. Despite these challenges, the MRF computes a very good estimate of the preferred driving directions 154 for this environment.

Figure 4G:
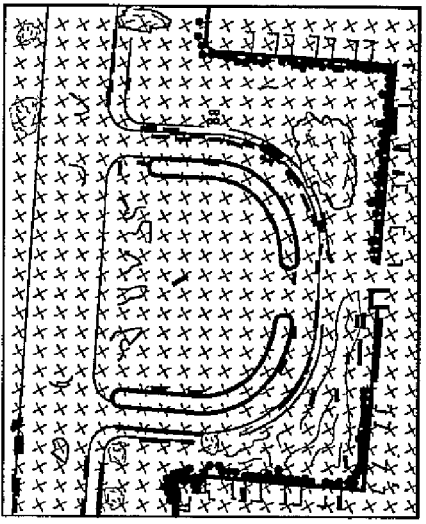
Figure 4H:
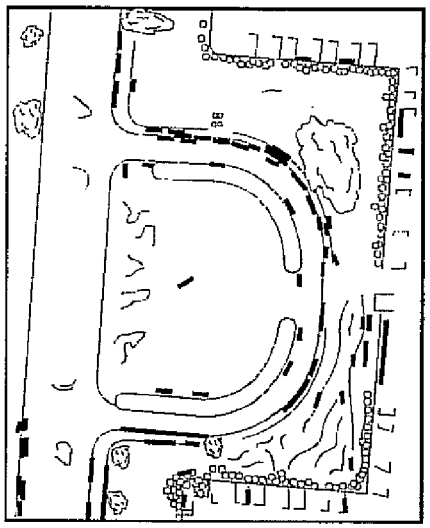
Figure 4I:
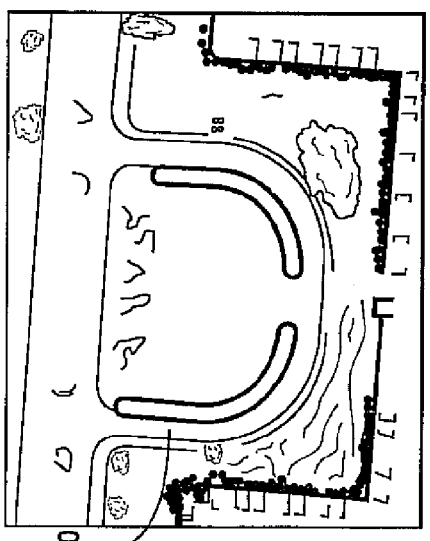

FIGS. 4G-4I show the ability of the algorithm to handle environments with gradually-changing orientations. The field of principal directions correctly follows the curved road segment 160.

Figure 4J:
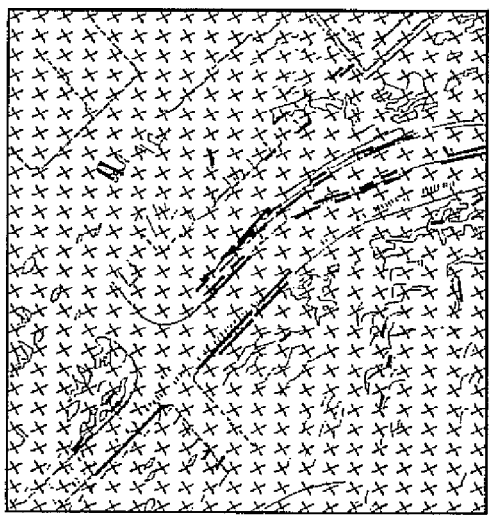
Figure 4K:
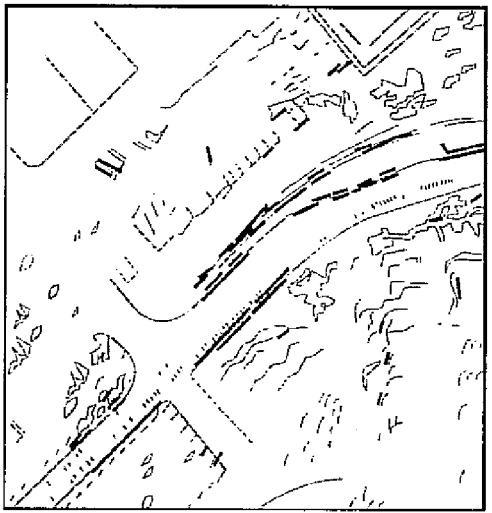
Figure 4L:
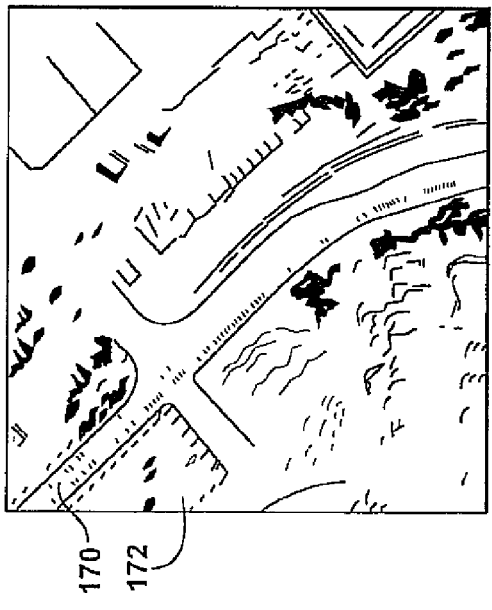

FIGS. 4J-4L show another challenging situation with a curved street 170, an intersection, and an adjacent parking lot 172. A parking lot with diagonally-parked cars is located in upper-right corner of the map at 174. In this situation, the parked cars, whose sides are usually detected as lines, and features of the parking lots themselves (e.g., curbs) present conflicting evidence regarding the principal orientation of the environment.

Figure 5:
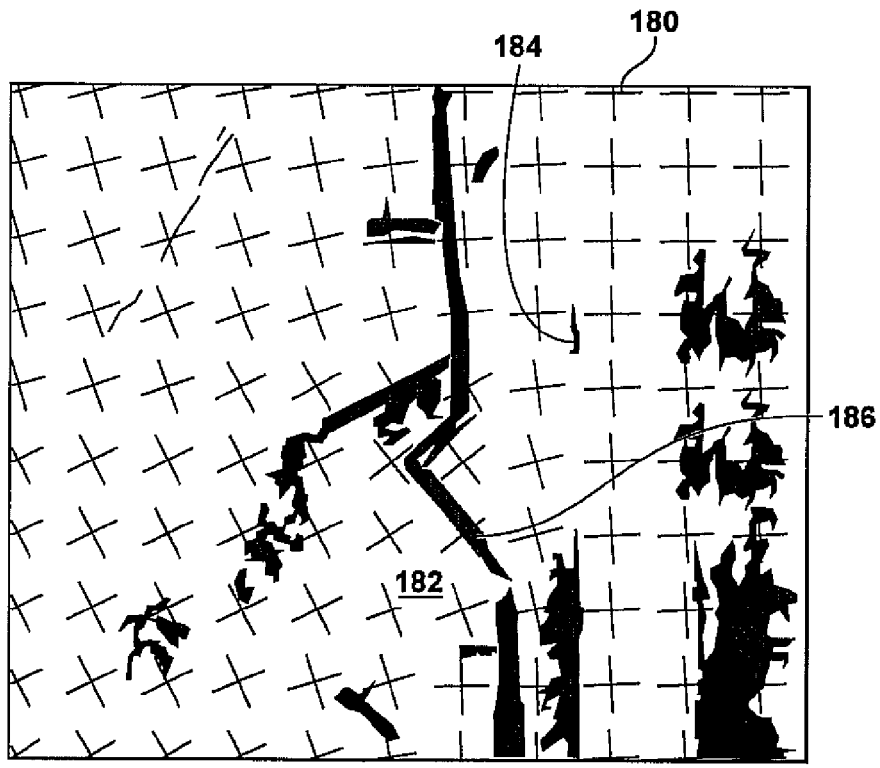
FIG. 5 shows an example determination of principal directions.

FIG. 5 shows a building 182 located very close to a parking lot, the building being oriented at a different angle and providing bad evidence for the MRF. However, as can be seen from the vector field 180 in FIG. 5, the MRF is able to compute the correct orientation for the drivable area, despite the fact that the curb separating the corner of the building from the parking lot is not detected. Linear features are shown, such as features 184 and 186.

Figure 6:
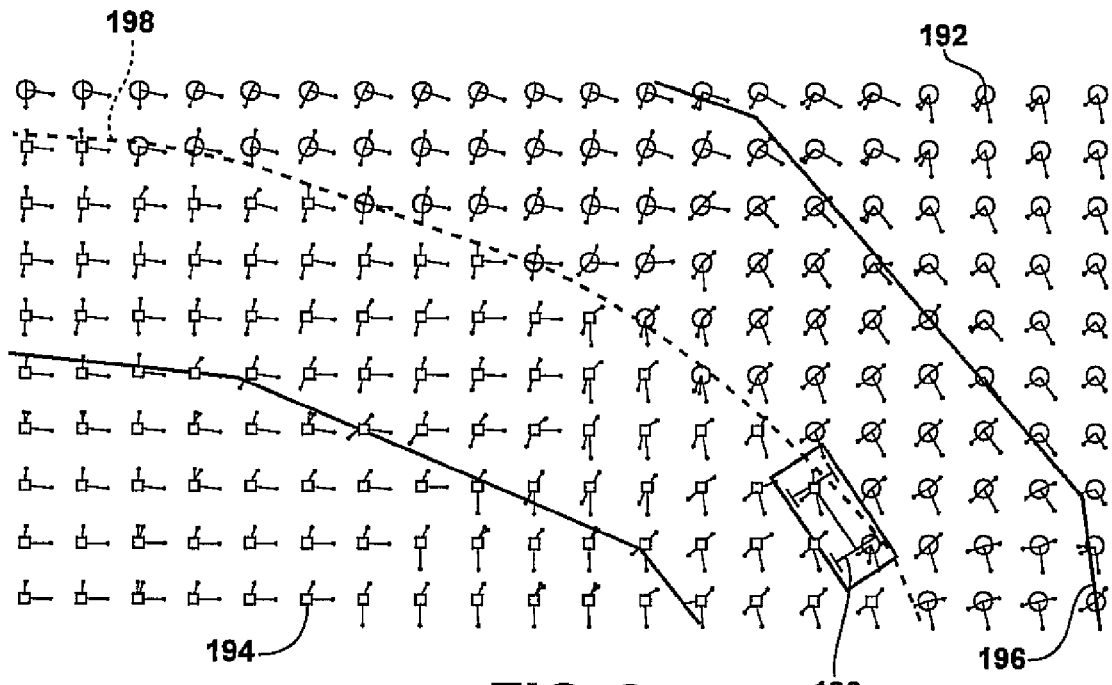
FIG. 6 shows a drivable path divided into left and right sides around a curve.

FIG. 6 shows partition of a drivable path for vehicle 190 into left and right sides by considering the relative orientation of the vector towards a Voronoi edge. One side is shown as circular nodes 192, the other as gray squares 194. Line 196 represents the edge of the road. The detected center line is shown as dashed line 198.

The computation of principal directions was done on a 3 GHz Intel Core-2 PC. Timing results were obtained for experiments run with the following parameters: the obstacle grid was 200 m×200 m with 10 cm resolution, the MRF evidence grid was 200 m×200 m with 5 m resolution (resulting in an MRF with 1600 nodes). The performance of the algorithm was usually dominated by the running time of the conjugate gradient algorithm, and with the average update computation time of around 400 ms, the method is well suited for real-time path planning since it is usually not necessary to update the field of principal directions during every planning cycle.

Path Planning

Global path planning can be accomplished using algorithms such as continuous forward search via path sampling or discrete search as representative examples. Assuming that a rough global plan has been computed, the field of principal directions can be used in a path-smoothing phase of planning. Given a global plan, the smoothing problem can be formulated as a continuous optimization on the coordinates of the vertices of the trajectory. In this example, smoothness and compliance with principal directions are considered. In other examples, other important aspects of a realistic path smoother such as kinematic constraints of the vehicle and collision-avoidance terms can be included. For a given trajectory $\{(x_l, y_l)\}$, the smoothness of the trajectory and the bias towards driving alone principal directions can then be expressed as:

$$f = w_{sm} \sum_{l=1}^{N-1} (\Delta x_{l+1} - \Delta x_l)^2 + w_{pd} \sum_{l=1}^{N} \mu(\theta(x_l, y_l), \sigma_l), \quad (8)$$

where $\theta(x_l, y_l)$ is the principal direction at the MRF node closest to $(x_l, y_l)$; $w_{sm}$ and $w_{pd}$ are the weights on smoothness and the principal-direction bias, respectively; $\mu$ is a potential on the difference of two angles, which can be defined in a variety of ways, for example:

$$\mu(\theta(x_l,y_l),\sigma_l)=1-\cos(2(\theta(x_l,y_l)-\sigma_l)) \quad (9)$$

This smoothing problem can be solved using several efficient numerical techniques. One approach is to use a conjugate-gradient algorithm.

Figure 7C:
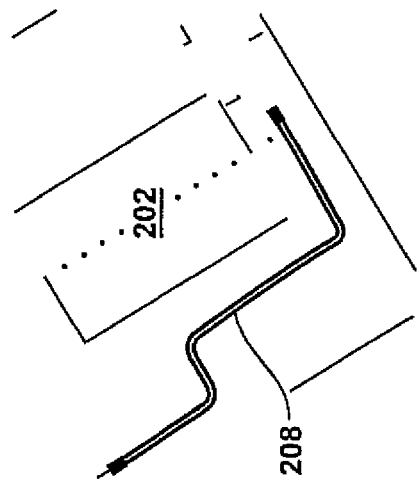
FIG. 7A-7C illustrate path planning using principal directions.
Figure 7B:
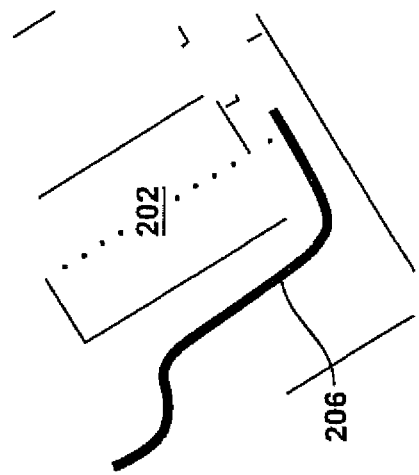
Figure 7A:
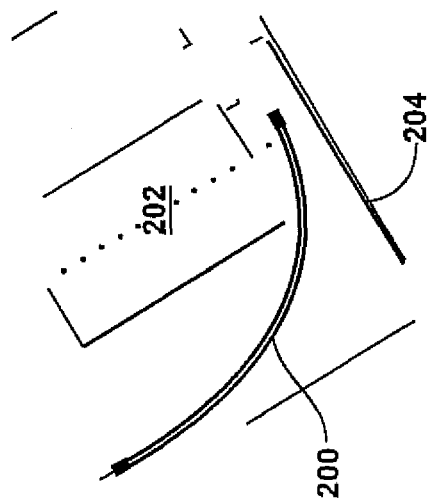

FIGS. 7A-7C illustrates the effect of principal directions on path planning. FIG. 7A shows path planning where principal directions are not used, showing building 202 and curb 204. FIGS. 7B and 7C show path planning favoring trajectories that are aligned with the principal direction (modulus π/2). FIG. 7C uses a higher weight on the principal direction component than the path shown in FIG. 7B.

FIG. 7A minimizes the quadratic-curvature term in Equation 8, subject to constraints on collision avoidance and kinematics of the car, but $w_{pm}=0$ and principal directions are ignored. The driving style exemplified by such a trajectory (200) is often considered sub-optimal. Turning on the bias for aligning the trajectory with the principal directions leads to solutions shown in FIG. 7B (trajectory 206) and FIG. 7C (trajectory 208, where FIG. 7C has a higher $w_{pm}$ than FIG. 7B). Such compliance with the orientation of the environment can be useful in many driving situations.

Environmental Sensors and Images

Environment image data can be collected using a lidar environmental sensor associated with the vehicle. However, other sensors can be used, including radar transceivers, optical and/or IR image sensors (including cameras and video sensors), ultrasound devices, and the like. A vehicle may have one or more sensors such as those discussed elsewhere in this specification.

In some examples, sensor data may be received from a source external to the vehicle, such as wireless reception of data from an external network such as the Internet. Aerial images, such as satellite images, may be obtained over a communications link such as a wireless link, and used to determine principal directions within the environment represented by the received data.

In other examples, a vehicle may collect sensor data while operating in an environment, for example under human operation or while the environment is not being used by other vehicles. Principal directions may be determined using subsequent analysis, and used by an autonomous vehicle, which need not the same vehicle used to collect the sensor data.

Principal Directions

Principal driving directions (sometimes referred to herein as "principal directions") represent vehicle directions within the environment that a human-operated vehicle would conventionally use. For example, in a highly structured environment such as a parking lot, a human-operated vehicle would conventionally move parallel to intended passageways (e.g. the aisles), and such structure may be defined by one or more of the following: parked vehicles, markings on the road such as painted lines, curbs, or areas of vegetation. The principal directions, and intended passageways, represent directions of vehicular motion intended by a designer of the structured environment, or those perceived as the intended directions by a typical human driver. A human driver might choose to disregard such intended directions by driving diagonally across an empty parking lot, but the human driver would generally be aware of the principal directions even as the driver chose to ignore them.

A highly-structured environment has intended limitations on driving directions imposed by structure, such as and may include environments such as parking lots, shopping malls, construction zones, and the like. Examples of the present invention allow an autonomous navigation system to detect drivable lanes and principal directions in such environments.

The determination of principal directions helps a robotic vehicle to comply with driving rules and conventions, allowing predictable operation and allowing the robotic vehicle to safely share the environment with human drivers, as discussed further below.

Autonomous Vehicle Operation

Examples of the present invention allow improved autonomous navigation in structured environments by vehicles, such as robotic vehicles. Environments may include simple environments such as streets and highways, complex environments, and off-road environments. For on-street driving, a map of the global road network can be used to determine principal directions. Determination of the principal directions allows a robotic vehicle to obey driving rules, such as driving on the appropriate side of the road, and not straddling the lane boundaries.

Example environments also include well-structured environments where a detailed map may not be available, but in which a vehicle should obey the rules of driving. Such environments may include, for example, parking lots, shopping malls, and construction zones. In such environments, human drivers are usually able to partition the space into drivable lanes and drive appropriately, even in the absence of typical road markings and signs. Examples of the present invention allow a robotic vehicle to determine such partitions and principal directions in such environments, allowing the vehicle to navigate the environment in a safer and more predictable manner.

A robot operating in such an environment can recognize features of the environment that allow it to drive in accordance with driving rules, for example using data from on-board sensors. The determination of principal directions allows a robotic vehicle to comply with driving rules and driving conventions, allowing predictable operation and allowing the robotic vehicle to safely share the environment with human drivers.

For some unstructured off-road environments, the usual rules of driving may not apply. In such cases there may be no detectable principal directions, for example due to the absence of any detectable linear features, so that a robotic vehicle may choose any drivable and safe path to its goal.

According to some examples of the present invention, autonomous vehicles may also operate indoors, or within other commercial environments, for example within warehouses.

Some examples of the present invention include improved methods of mapping an environment. Environment image data may be analyzed so as to detect principal directions.

Examples of the present invention allow improved autonomous vehicles that can operate predictably in unknown environments and follow the standard conventions of human driving. Another high-level driving behavior that is challenging to implement is the adherence to the established convention of passing oncoming traffic on the correct side. A straightforward method of partitioning the space into "left" and "right" regions can be developed by using a Voronoi diagram of the obstacle map and labeling points based on which side of the Voronoi edge they fall. Conventionally, sensor noise may produce fragmented obstacle maps that can lead to highly irregular Voronoi diagrams. This can be improved by considering the principal direction of the environment instead of the tangent of the Voronoi edge when classifying points (e.g., as shown in FIG. 6) because the former is a more globally consistent feature of the environment and is less sensitive to local noise.

Hence, examples of the present invention relates to apparatus and methods of detecting principal driving directions in unknown or unmapped environments such as parking lots. Such detection is useful in autonomous navigation to help assist vehicles to operate in a predictable fashion obeying the rules and conventions of driving. Local linear features can be detected in the environment using the vehicle's on-board sensors. The linear feature data can be passed to a Markov random field model whose solution provides a high-likelihood field of principal directions.

In other examples, the detected features need not be linear. For example, if drivable lanes are known to have curved forms, arcs or other curves may be detected within the environmental image. The evidence node passed to a given node of the MRF may be the average angular orientation of a curve section as it passes proximate to a given node, for example the average orientation of a curve section as it passes through an associated grid square.

In further examples, obstacle data can be combined with visual camera data and surface-reflectivity data from lidars for detecting and recognizing more advanced features within the environment.

The invention is not restricted to the illustrative examples described above. Examples described are exemplary, and are not intended to limit the scope of the invention. Changes therein, other combinations of elements, and other uses will occur to those skilled in the art. The scope of the invention is defined by the scope of the claims.

Having described our invention, we claim:

1. A method of determining principal directions for an environment, the principal directions relating to vehicle operation within the environment, the method comprising:

forming a graphical model of the environment, the graphical model having nodes corresponding to spatial locations within the environment, the graphical model being a Markov random field model; and determining principal directions for the nodes using linear features detected within the environment, determining the principal directions further including determining principal directions for nodes having at least one proximate linear feature using angular data related to the at least one proximate linear feature, and determining principal directions for nodes not having a proximate linear feature using a potential function for change in principal direction between neighboring nodes, the potential function being selected to obtain a smooth variation in principal directions between neighboring nodes.

2. The method of claim 1, wherein the potential function for change in principal direction between neighboring nodes has the form $$\Phi(\theta) = \frac{1}{2} \sum_i \sum_{j \in N(i)} \varphi(\theta_i, \theta_j),$$

where N(i) is a set of neighbors of node i, and φ is a distance measure between angles of the principal directions of neighboring nodes.

3. The method of claim 2, using the distance measure $\phi(\beta,\gamma)=\sin^2(2(\beta-\gamma))$, where β and γ represent angles for the principal directions of neighboring nodes.

4. The method of claim 1, the nodes representing an array of spatial coordinates within a two-dimensional image representing the environment.

5. The method of claim 1, further including detection of linear features within the environment using a sensor system located on a vehicle, the principal directions being used to determine a trajectory of the vehicle through the environment.

6. The method of claim 1, further comprising detection of linear features within the environment using a sensor system, the detection of the linear features comprising acquiring image data representing the environment, and detecting linear features within the image data.

7. The method of claim 6, further comprising image processing of the image data before linear feature detection, the image processing including threshold filtering and edge detection.

8. The method of claim 6, the sensor system including a lidar sensor.

9. The method of claim 6, the sensor system including at least one sensor selected from the group of sensors consisting of a radar sensor, an optical sensor, and an IR sensor.

10. A method of determining principal driving directions within an environment, the method comprising:

obtaining image data representing the environment;

detecting linear features within the image data;

forming a graphical model of the environment, the graphical model having a plurality of nodes corresponding to spatial locations within the environment;

determining principal directions for nodes having a proximate linear feature using angular data related to the proximate linear feature; and assigning principal directions for nodes not having a proximate linear feature using a potential function for angular changes in principal direction between neighboring nodes, the potential function being selected to obtain a smooth variation in principal directions between neighboring nodes.

11. The method of claim 10, further comprising using the principal directions to assist steering a vehicle through the environment.

12. The method of claim 10, the graphical model being a Markov random field model, the nodes representing a grid of spatial coordinates within the environment, the linear features providing local evidence of principal direction.

13. The method of claim 10, further comprising determining principal directions for nodes having a plurality of proximate linear features using a weighted average of angular data related to the plurality of proximate linear features.

14. The method of claim 13, the weighted average using linear feature length as a weighting factor.

15. An apparatus operable to assist autonomous navigation of a vehicle through an environment, the apparatus comprising;

an environment sensor supported by the vehicle; and an electronic circuit, receiving sensor data from the environment sensor, the electronic circuit being operable to:

detect linear features within the environment, and determine principal directions within the environment using a Markov random field model having nodes corresponding to spatial locations within the environment, angular data related to the linear features being input into the Markov random field model, principal directions for nodes having at least one proximate linear feature being determined using angular data related to the at least one proximate linear feature, principal directions for nodes not having a proximate linear feature being determined using a potential function for change in principal direction between neighboring nodes, and the potential function giving a smooth variation in principal directions between neighboring nodes.

16. The apparatus of claim 15, the environment sensor including at least one sensor selected from the group of sensors consisting of a lidar sensor, a radar sensor, an optical sensor, and an IR sensor.

17. The apparatus of claim 15, the electronic circuit comprising a processor operable to execute an algorithm, the algorithm being operable to determine the principal directions within the environment using the Markov random field model.

* * * * *

UNITED STATES PATENT AND TRADEMARK OFFICE
CERTIFICATE OF CORRECTION

PATENT NO.       : 8,060,271 B2                                    Page 1 of 1
APPLICATION NO.  : 12/134763
DATED            : November 15, 2011
INVENTOR(S)      : Dolgov et al.

It is certified that error appears in the above-identified patent and that said Letters Patent is hereby corrected as shown below:

Col. 10, line 26: replace "alone" with --along--.

Signed and Sealed this
Twenty-seventh Day of March, 2012

David J. Kappos
*Director of the United States Patent and Trademark Office*